(12) United States Patent
Lee et al.

(10) Patent No.: US 11,281,294 B2
(45) Date of Patent: Mar. 22, 2022

(54) SMART CONTROL DEVICE FOR DETERMINING USER'S INTENTION FROM COLOR STIMULUS BASED ON BRAIN-COMPUTER INTERFACE AND CONTROL METHOD THEREOF

(71) Applicant: Korea University Research and Business Foundation, Seoul (KR)

(72) Inventors: Seong-Whan Lee, Seoul (KR); Byeong-hoo Lee, Seoul (KR); Ji-Hoon Jeong, Seoul (KR); Do-Yeun Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/151,957

(22) Filed: Jan. 19, 2021

(65) Prior Publication Data

US 2021/0247843 A1 Aug. 12, 2021

(30) Foreign Application Priority Data

Feb. 11, 2020 (KR) .......................... 10-2020-0016585

(51) Int. Cl.
*G06F 3/01* (2006.01)
(52) U.S. Cl.
CPC .................................... *G06F 3/015* (2013.01)
(58) Field of Classification Search
CPC ....................................................... G06F 3/015
USPC .......................................................... 345/156
See application file for complete search history.

(56) References Cited

U.S. PATENT DOCUMENTS

| | | | |
|---|---|---|---|
| 10,990,175 B2* | 4/2021 | Forsland | G06F 3/011 |
| 2014/0333529 A1* | 11/2014 | Kim | G06F 3/015 345/156 |
| 2015/0351655 A1* | 12/2015 | Coleman | G16H 50/20 600/301 |
| 2017/0189639 A1* | 7/2017 | Mastrianni | A61M 21/02 |
| 2020/0297263 A1* | 9/2020 | Kouider | A61B 5/369 |
| 2020/0356170 A1* | 11/2020 | An | A61B 5/374 |

FOREIGN PATENT DOCUMENTS

| | | |
|---|---|---|
| KR | 10-2014-0026311 A | 3/2014 |
| KR | 10-1431203 B1 | 8/2014 |
| KR | 10-2014-0129820 A | 11/2014 |
| KR | 10-1727166 B1 | 4/2017 |
| KR | 10-1973081 B1 | 4/2019 |
| KR | 10-2019-0056287 A | 5/2019 |

OTHER PUBLICATIONS

Korean Office Action dated Aug. 27, 2021 in counterpart Korean Patent Application No. 10-2020-0016585 (4 pages in Korean).

* cited by examiner

*Primary Examiner* — Calvin C Ma
(74) *Attorney, Agent, or Firm* — NSIP Law

(57) ABSTRACT

Provided is a smart control device including: a collection unit that collects a brain signal generated from a visual stimulus for color; a preprocessing unit that extracts pattern information from the brain signal; a selection unit that selects reference information having the highest correlation by comparing the pattern information to reference information provided in advance; and a control unit that has control commands set in advance and executes the control command matching the selected reference information.

17 Claims, 7 Drawing Sheets

SMART CONTROL DEVICE FOR DETERMINING USER'S INTENTION FROM COLOR STIMULUS BASED ON BRAIN-COMPUTER INTERFACE AND CONTROL METHOD THEREOF

CROSS-REFERENCE TO RELATED APPLICATIONS

This application claims priority under 35 U.S.C. § 119 to Korean Patent Application No. 10-2020-0016585, filed on Feb. 11, 2020, in the Korean Intellectual Property Office, the disclosure of which is incorporated herein by reference in its entirety.

TECHNICAL FIELD

The present disclosure relates to a smart control device for determining a user's intention from a color stimulus based on a brain-computer interface and a control method thereof, and more particularly, to a smart control device that controls an external device according to a pattern of a brain signal generated from a visual stimulus for color, and a control method thereof.

BACKGROUND

A brain-computer interface is a technology that recognizes a user's intention through brain signals and controls an external device accordingly. In the related art, the brain-computer interface is mainly used in medical fields such as control of prosthetic devices for patients whose bodies are not free or paralyzed due to spinal injuries or neurodegenerative diseases, a speller for communication, and the like.

However, in recent years, due to the development of brain signal analysis technology, a brain-computer interface is being applied in various fields through the development of daily life assistance services for ordinary people.

In this regard, brain signals are electrical signals that are expressed when information is transmitted between the nervous system and cranial nerves of the human body. In particular, using non-invasive methods, brain signals can be measured through electrodes attached to the scalp without additional surgical operation, and are an important tool to grasp a user's intention because the real-time activity of the brain can be measured. In general, it is known that brain signals can be classified into various types according to time, frequency bands, and spatial characteristics, and alpha waves (frequency 8 to 13 Hz, amplitude 20 to 60 $\mu V$) expressed in a comfortable state with eyes closed, beta waves (14 to 30 Hz, amplitude 2 to 20 $\mu V$) expressed in a consciously focused state, theta waves (frequency 4 to 7 Hz, amplitude 20 to 100 $\mu V$) expressed in shallow sleep, and the like are known.

On the other hand, brain signals can be changed by various stimuli. For example, spatiotemporal changes (event-related desynchronization/synchronization (ERD/ERS)) in brain signal patterns caused by an imagination of movement of a specific site, or a specific stimulus and changes in brain signal patterns that respond to a visual stimulus may be present, and accordingly, there is a demand for a method of controlling an external device by using a change in brain signal pattern.

SUMMARY

A technical object to be achieved by the present disclosure is to provide a smart control device for controlling an external device according to a pattern of brain signals generated from a visual stimulus for color, and a control method thereof.

According to an aspect of the present disclosure, a smart control device includes: a collection unit that collects a brain signal generated from a visual stimulus for a light-emitting body showing an arbitrary color; a preprocessing unit that extracts pattern information according to a frequency band and a time range from the brain signal; a selection unit that calculates correlations by comparing the pattern information to reference information provided in advance to represent patterns of brain signals generated from visual stimuli for colors, and selects the reference information having the highest correlation; and a control unit that has control commands set in advance according to the patterns of the brain signals generated from visual stimulus for colors, and executes the control command matching the selected reference information.

In addition, the preprocessing unit may generate the pattern information by extracting information in a time range of 3,000 ms from a brain signal classified into at least one frequency band.

In addition, the pattern information may be a result value of a power spectrum density calculated from the brain signal classified according to the frequency band and the time range.

In addition, the selection unit may calculate the correlations between the reference information and the pattern information according to a canonical correlation analysis, and select the reference information having the highest correlation.

In addition, the preprocessing unit may generate at least one frequency band by dividing a frequency range of 0.1 Hz to 50 Hz by a preset frequency interval.

In addition, the control unit may set a control command according to at least one color of red, green, blue, gray, and white.

According to another aspect of the present disclosure, a control method of a smart control device for determining a user's intention from a color stimulus based on a brain-computer interface, includes: a step of collecting a brain signal generated from a visual stimulus for a light-emitting body showing an arbitrary color; a step of extracting pattern information according to a frequency band and a time range from the brain signal; a step of calculating correlations by comparing the pattern information to reference information provided in advance to represent patterns of brain signals generated from visual stimuli for colors, and selecting the reference information having the highest correlation; and a step of providing control commands set in advance according to the patterns of the brain signals generated from visual stimulus for colors, and executing the control command matching the selected reference information.

In addition, in the step of extracting pattern information, the pattern information may be generated by extracting information in a time range of 3,000 ms from a brain signal classified into at least one frequency band.

In addition, the pattern information may be a result value of a power spectrum density calculated from the brain signal classified according to the frequency band and the time range.

In addition, in the step of selecting the reference information having the highest correlation, the correlations between the reference information and the pattern information may be calculated according to a canonical correlation analysis, and the reference information having the highest correlation may be selected.

In addition, in the step of extracting pattern information, at least one frequency band may be generated by dividing a frequency range of 0.1 Hz to 50 Hz by a preset frequency interval.

In addition, in the step of executing the control command, a control command may be set according to at least one color of red, green, blue, gray, and white.

According to the aspects of the present disclosure described above, by providing a smart control device for determining a user's intention from a color stimulus based on a brain-computer interface and a control method thereof, it is possible to control an external device according to a pattern of a brain signal generated from a visual stimulus for color.

DETAILED DESCRIPTION OF EMBODIMENTS

Figure 1:
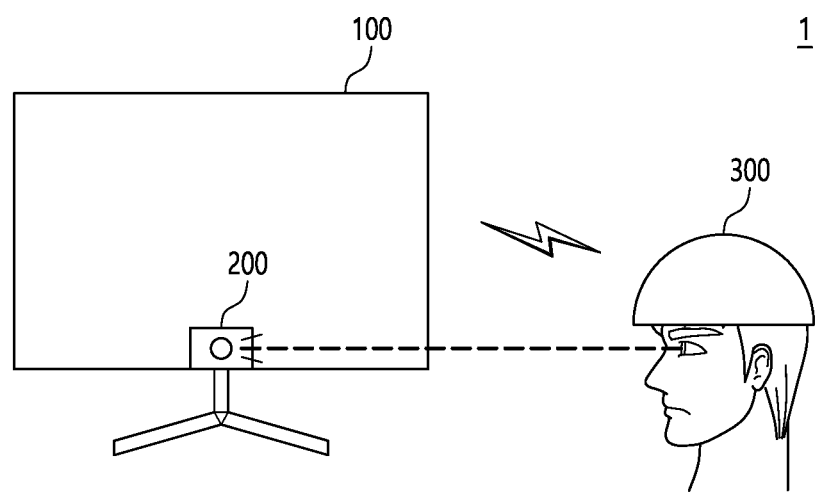
FIGS. 1 and 2 are schematic diagrams of a smart control system according to an embodiment of the present disclosure.

The detailed description of the present disclosure to be described below refers to the accompanying drawings, which illustrate specific embodiments in which the present disclosure may be implemented. These embodiments are described in detail sufficient to enable those skilled in the art to implement the present disclosure. It should be understood that various embodiments of the present disclosure are different from each other but need not be mutually exclusive. For example, specific shapes, structures, and characteristics described herein may be implemented in other embodiments without departing from the spirit and scope of the present disclosure in relation to one embodiment. In addition, it should be understood that the location or arrangement of individual constituent elements within each disclosed embodiment may be changed without departing from the spirit and scope of the present disclosure. Therefore, the detailed description to be described below is not intended to be taken in a limiting sense, and the scope of the present disclosure, if properly described, is limited only by the appended claims, along with all scopes equivalent to those claimed by the claims. Like reference numerals in the drawings refer to the same or similar functions over several aspects.

Hereinafter, preferred embodiments of the present disclosure will be described in more detail with reference to the drawings.

Figure 2:
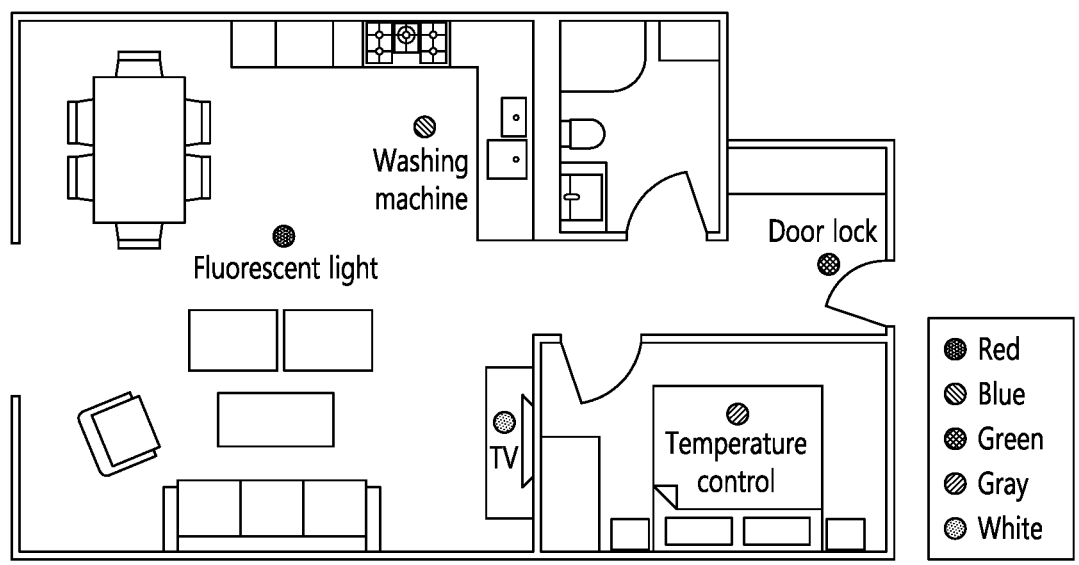

FIGS. 1 and 2 are schematic diagrams of a smart control system according to an embodiment of the present disclosure.

A smart control system 1 may include an external device 100, a light-emitting body 200, and a smart control device 300.

The external device 100 may be controlled by the smart control device 300, and at this time, the external device 100 may perform a preset operation according to a control command transmitted from the smart control device 300.

For example, as the external device 100, various devices such as a TV, a computer, an air conditioner, and a boiler may be used. Accordingly, the control command may be set to switch the power state of the external device 100, the control command may be set to increase or decrease the set temperature of the air conditioner, boiler, or the like, the control command may be set to show an arbitrary channel among TV channels, or the control command may be set to execute an arbitrary program on the computer.

As described above, the control command transmitted from the smart control device 300 to the external device 100 and set to allow the external device 100 to perform an operation may be variously set depending on the external device 100.

The light-emitting body 200 may be provided to show an arbitrary color. Here, in a case where a plurality of light-emitting bodies emitting different colors are provided, the smart control device 300 may distinguish patterns of brain signals generated from visual stimuli for different colors and transmit a control command set according to each color to the external device 100.

For example, as the light-emitting body 200, light-emitting bodies respectively showing colors such as red, green, blue, gray, and white that can be distinguished with a higher probability in the brain-computer interface may be provided, and the smart control device 300 may distinguish patterns of brain signals generated from visual stimuli for the colors, and transmit a control command set according to the distinguished pattern to the external device 100.

Meanwhile, as the light-emitting body 200, an LED or the like may be used, and the light-emitting body 200 may be provided to turn on and off at an arbitrary frequency. In this regard, as the light-emitting body 200, a plurality of light-emitting bodies 200 showing the same color may be provided to turn on and off at different frequencies.

The smart control device 300 may collect a brain signal generated from a visual stimulus for the light-emitting body 200 showing an arbitrary color. In addition, the smart control device 300 may collect a brain signal generated from a visual stimulus for the light-emitting body 200 turning on and off at an arbitrary frequency.

For this, the smart control device 300 may be provided with at least one electrode to detect a brain signal, a biosignal, or the like of a user, and the smart control device 300 may be provided with a measurer that records the brain signal, the biosignal, or the like transmitted from the electrode.

At this time, as the electrode that detects the brain signal, the biosignal, or the like, one of a wet electrode and a dry electrode may be used, and the measurer may receive the brain signal or the biosignal from the electrode through wired or wireless communication.

Here, a part in which the brain signal or the biosignal is generated may be the visual cortex of the human body. In this regard, it is known that in a case where the user gazes at the light-emitting body 200, a brain signal having the same frequency as the stimulus acting on the sense of sight is generated in the visual cortex.

On the other hand, the smart control device 300 may measure the brain signal or the biosignal by an external input, or the smart control device 300 may measure the brain signal or the biosignal at each preset time interval.

The smart control device 300 may extract pattern information according to a frequency band and a time range from the measured brain signal.

At this time, the smart control device 300 may extract a frequency component from the brain signal using a technique such as a fast Fourier transform (FFT), and may extract information in at least one frequency band from the brain signal using a band pass filter provided at a preset frequency interval.

Here, the smart control device 300 may generate at least one frequency band by dividing a frequency range appearing from the brain signal or the biosignal by a predetermined interval.

For example, the frequency range appearing from the brain signal or the biosignal may be 0.1 Hz to 50 Hz, and in a case where the frequency range is divided by a frequency interval of 3 Hz to 5 Hz, the frequency bands may be 0.1 Hz to 3 Hz, 4 Hz to 7 Hz, 8 Hz to 13 Hz, . . . , and 45 Hz to 50 Hz.

Meanwhile, the smart control device 300 may generate pattern information by extracting information in a preset time range from the brain signal classified into at least one frequency band.

In this case, the preset time range may be set to a time range such as 3,000 ms, and a plurality of pieces of pattern information extracted from one frequency band classified from the brain signal into arbitrary time ranges may be generated. Here, each piece of pattern information may be extracted so that some of information included in the pattern information overlaps.

For example, in a case where pattern information extracted from one frequency band classified from the brain signal measured during 20,000 ms is extracted into time ranges of 3,000 ms, and each time range is extracted into intervals of 1,000 ms, 18 pieces of pattern information may be extracted from one frequency band classified from the brain signal. At this time, in a case where the frequency range appearing from the brain signal is classified into 10 frequency bands, 180 pieces of pattern information may be extracted from the brain signal.

Meanwhile, the pattern information may be a result value of a power spectrum density (PSD) calculated from the brain signal classified according to the frequency band and the time range.

In this regard, the power spectrum density means energy appearing from a finite signal, and since a method of calculating the power spectrum density is commercially available, a detailed description thereof will be omitted.

The smart control device 300 may calculate correlations by comparing the pattern information extracted from the brain signal to reference information provided in advance to represent patterns of brain signals generated from visual stimuli for colors, and the smart control device 300 may select the pattern information having the highest correlation.

Here, the reference information may be information representing the magnitude of the power spectrum density appearing in an arbitrary frequency band and in an arbitrary time range. In this case, the frequency band and time range of the reference information may be the same as the frequency band and time range of the pattern information.

Accordingly, the smart control device 300 may calculate the correlations between the reference information and the pattern information according to a canonical correlation analysis (CCA), and select the reference information having the highest correlation.

Here, the canonical correlation analysis is a technique that calculates the correlation between two variable groups to show the correlation between the two variable groups. Accordingly, the smart control device 300 may calculate the correlation between each piece of pattern information and the reference information and select the reference information having the highest correlation.

Meanwhile, the reference information may be set differently according to individual characteristics. For example, in the case of visual impairment such as color blindness, strabismus, cataract, and glaucoma, the brain signal generated from a visual stimulus for a specific color may be partially or totally different from that of an ordinary person, and the reference information for this may be set differently.

The smart control device 300 may have control commands set in advance according to the patterns of the brain signals generated from visual stimuli for colors, and the smart control device 300 may execute the control command matching the selected reference information.

At this time, the smart control device 300 may set different control commands for at least one color that may be shown by the light-emitting body 200, and the smart control device 300 may also set different control commands according to the frequency at which the light-emitting body 200 turns on and off.

In this regard, the smart control device 300 may set different control commands for one external device 100 according to at least one color or at least one turning frequency.

For example, the smart control device 300 may switch the power state of the computer according to the pattern of the brain signal generated from a visual stimulus by the red light-emitting body 200, and the smart control device 300 may execute an arbitrary program installed in the computer according to the pattern of the brain signal generated from a visual stimulus by the green light-emitting body 200. In addition, the smart control device 300 may lower the volume of the operating system installed in the computer according to the pattern of the brain signal generated from a visual stimulus by the blue light-emitting body 200, and the smart control device 300 may increase the volume of the operating system installed in the computer according to the pattern of the brain signal generated from a visual stimulus by the gray light-emitting body 200.

Meanwhile, the smart control device 300 may set different control commands for a plurality of external devices 100 according to at least one color or at least one turning frequency.

For example, the smart control device 300 may switch the power state of the computer according to the pattern of the brain signal generated from a visual stimulus by the red light-emitting body 200, and the smart control device 300 may switch the power state of the air conditioner according to the pattern of the brain signal generated from a visual stimulus by the green light-emitting body 200. In addition, the smart control device 300 may switch the power state of the TV according to the pattern of the brain signal generated from a visual stimulus by the blue light-emitting body 200, and the smart control device 300 may switch the state of a blind installed on the window according to the pattern of the brain signal generated from a visual stimulus by the gray light-emitting body 200.

Referring to FIG. 2, the external devices 100 in which the control command is set according to the color of the light-emitting body 200 can be checked.

As described above, the smart control device 300 may distinguish the patterns of the brain signals generated from visual stimuli for different colors and transmit the control commands set according to the colors to the corresponding external devices 100.

Figure 3:
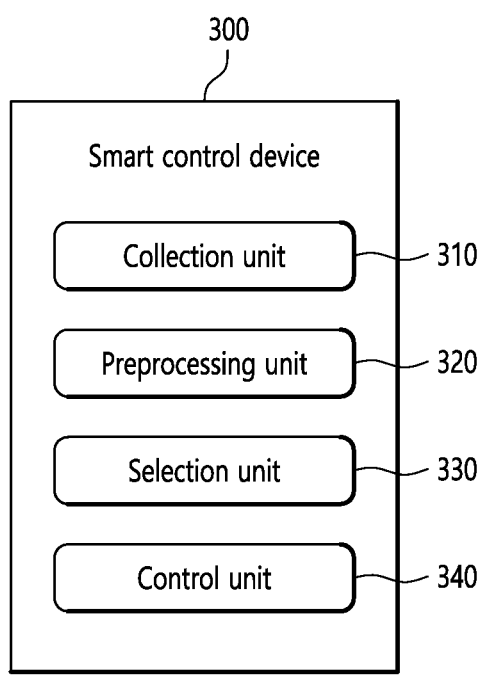
FIG. 3 is a control block diagram of a smart control device according to the embodiment of the present disclosure.

FIG. 3 is a control block diagram of the smart control device according to the embodiment of the present disclosure The smart control device 300 may include a collection unit 310, a preprocessing unit 320, a selection unit 330, and a control unit 340.

The collection unit 310 may collect a brain signal generated from a visual stimulus for the light-emitting body 200 showing an arbitrary color. In addition, the collection unit 310 may collect a brain signal generated from a visual stimulus for the light-emitting body 200 turning on and off at an arbitrary frequency.

At this time, the collection unit 310 may measure the brain signal or the biosignal by an external input, or the collection unit 310 may measure the brain signal or the biosignal at each preset time interval.

The preprocessing unit 320 may extract pattern information according to a frequency band and a time range from the measured brain signal.

At this time, the preprocessing unit 320 may extract a frequency component from the brain signal using a technique such as a fast Fourier transform (FFT), and may extract information in at least one frequency band from the brain signal using a band pass filter provided at a preset frequency interval.

Here, the preprocessing unit 320 may generate at least one frequency band by dividing a frequency range appearing from the brain signal or the biosignal by a predetermined interval.

Meanwhile, the preprocessing unit 320 may generate pattern information by extracting information in a preset time range from the brain signal classified into at least one frequency band.

In this case, the pattern information may be a result value of a power spectrum density (PSD) calculated from the brain signal classified according to the frequency band and the time range.

The selection unit 330 may calculate correlations by comparing the pattern information extracted from the brain signal to reference information provided in advance to represent patterns of brain signals generated from visual stimuli for colors, and the selection unit 330 may select the pattern information having the highest correlation.

In this case, the selection unit 330 may calculate the correlations between the reference information and the pattern information according to a canonical correlation analysis (CCA), and select the reference information having the highest correlation.

The control unit 340 may have control commands set in advance according to the patterns of the brain signals generated from visual stimuli for colors, and the control unit 340 may execute the control command matching the selected reference information.

At this time, the control unit 340 may set different control commands for at least one color that may be shown by the light-emitting body 200, and the control unit 340 may also set different control commands according to the frequency at which the light-emitting body 200 turns on and off.

Here, executing the control command by the control unit 340 can be understood as transmitting the control command to the external device 100 to allow the external device 100 to execute the control command. For this, the control unit 340 may transmit the control command to the external device 100 using a wired or wireless network.

Figure 4:
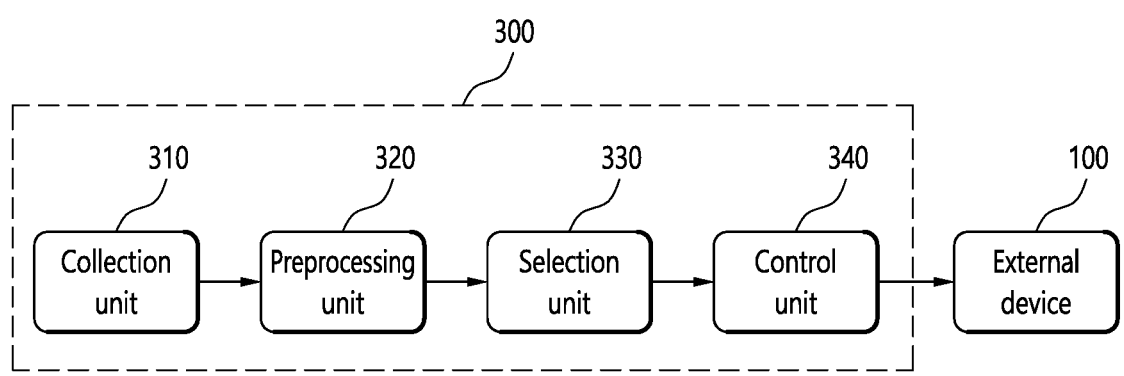
FIG. 4 is a block diagram illustrating a process of selecting pattern information from a brain signal by the smart control device according to the embodiment of the present disclosure.

FIG. 4 is a block diagram illustrating a process of selecting pattern information from a brain signal by the smart control device according to the embodiment of the present disclosure.

Referring to FIG. 4, the collection unit 310 may collect a brain signal generated from a visual stimulus for the light-emitting body 200 showing an arbitrary color. In addition, the collection unit 310 may collect a brain signal generated from a visual stimulus for the light-emitting body 200 turning on and off at an arbitrary frequency. At this time, the brain signal may be generated in a case where the user gazes at the light-emitting body 200 showing an arbitrary color.

Accordingly, the preprocessing unit 320 may extract a frequency component from the brain signal using a technique such as a fast Fourier transform (FFT), and may extract information in at least one frequency band from the brain signal using a band pass filter provided at a preset frequency interval. In addition, the preprocessing unit 320 may generate pattern information by extracting information in a preset time range from the brain signal classified into at least one frequency band.

In this case, the pattern information may be a result value of a power spectrum density (PSD) calculated from the brain signal classified according to the frequency band and the time range.

The selection unit 330 may calculate correlations by comparing the pattern information extracted from the brain signal to reference information provided in advance to represent patterns of brain signals generated from visual stimuli for colors, and the selection unit 330 may select the pattern information having the highest correlation.

In this case, the selection unit 330 may calculate the correlations between the reference information and the pattern information according to a canonical correlation analysis (CCA), and select the reference information having the highest correlation.

The control unit 340 may have control commands set in advance according to the patterns of the brain signals generated from visual stimuli for colors, and the control unit 340 may execute the control command matching the selected reference information.

Here, executing the control command by the control unit 340 can be understood as transmitting the control command to the external device 100 to allow the external device 100 to execute the control command. For this, the control unit 340 may transmit the control command to the external device 100 using a wired or wireless network.

Figure 5:
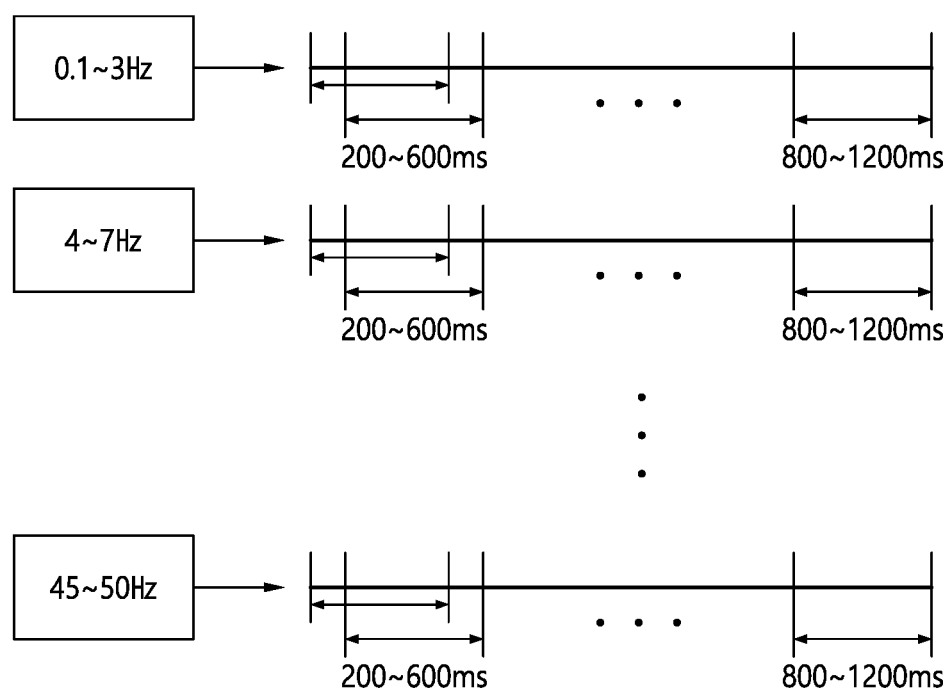
FIG. 5 is a schematic diagram showing the pattern information extracted from a preprocessing unit of FIG. 2.

FIG. 5 is a schematic diagram showing the pattern information extracted by the preprocessing unit of FIG. 2.

Referring to FIG. 5, it can be seen that a frequency range of 0.1 Hz to 50 Hz is divided by a frequency interval of 3 Hz to 5 Hz.

Accordingly, the preprocessing unit 320 may classify the frequency component extracted from the brain signal using a technique such as a fast Fourier transform into at least one frequency band from the brain signal by using a band pass filter provided at each frequency interval.

Meanwhile, each frequency band may be divided again by a preset time range, and referring to FIG. 5, it can be seen that each frequency band is divided by a time range of 400 ms from a brain signal measured for 1,200 ms. In this case, each divided frequency band may be divided so that some regions overlap.

As described above, the preprocessing unit 320 may generate pattern information by extracting information in a preset time range from the brain signal classified into at least one frequency band, and at this time, the pattern information may be a result value of a power spectrum density (PSD) calculated from the brain signal classified according to the frequency band and the time range.

Figure 6:
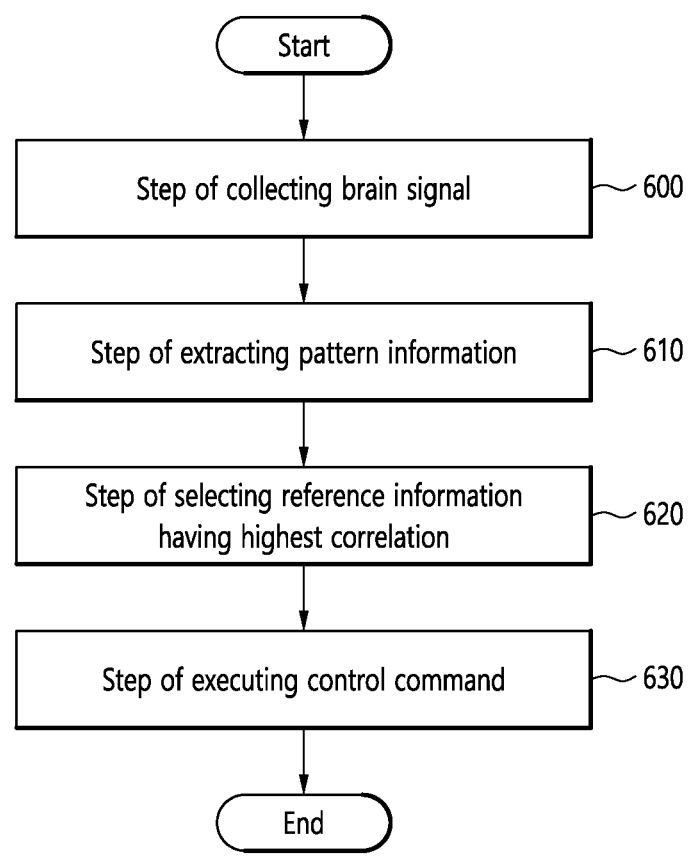
FIG. 6 is a flowchart of a control method of a smart control device according to an embodiment of the present disclosure.

FIG. 6 is a flowchart of a control method of a smart control device according to an embodiment of the present disclosure Since the control method of a smart control device according to the embodiment of the present disclosure proceeds on substantially the same configuration as the smart control device 300 shown in FIG. 1, like elements the same as the smart control device 300 of FIG. 1 are denoted by like reference numerals, and repeated descriptions will be omitted.

The control method of a smart control device includes: a step 600 of collecting a brain signal; a step 610 of extracting pattern information; a step 620 of selecting reference information having the highest correlation; and a step 630 of executing a control command.

In the step 600 of collecting a brain signal, a brain signal generated from a visual stimulus for the light-emitting body 200 showing an arbitrary color may be collected. In addition, in the step 600 of collecting a brain signal, a brain signal generated from a visual stimulus for the light-emitting body 200 turning on and off at an arbitrary frequency may be collected.

At this time, in the step 600 of collecting a brain signal, a brain signal or a biosignal may be measured by an external input, or in the step 600 of collecting a brain signal, the brain signal or the biosignal may be measured at each preset time interval.

In the step 610 of extracting pattern information, pattern information according to a frequency band and a time range may be extracted from the measured brain signal.

At this time, in the step 610 of extracting pattern information, a frequency component may be extracted from the brain signal using a technique such as a fast Fourier transform (FFT), and information in at least one frequency band may be extracted from the brain signal using a band pass filter provided at a preset frequency interval.

Here, in the step 610 of extracting the pattern information, at least one frequency band may be generated by dividing a frequency range appearing from the brain signal or the biosignal by a predetermined interval.

Meanwhile, in the step 610 of extracting pattern information, pattern information may be generated by extracting information in a preset time range from the brain signal classified into at least one frequency band.

In this case, the pattern information may be a result value of a power spectrum density (PSD) calculated from the brain signal classified according to the frequency band and the time range.

In the step 620 of selecting reference information having the highest correlation, correlations may be calculated by comparing the pattern information extracted from the brain signal to reference information provided in advance to represent patterns of brain signals generated from visual stimuli for colors, and in the step 620 of selecting reference information having the highest correlation, the pattern information having the highest correlation may be selected.

At this time, in the step 620 of selecting reference information having the highest correlation, the correlations between the reference information and the pattern information may be calculated according to a canonical correlation analysis (CCA), and the reference information having the highest correlation may be selected.

In the step 630 of executing a control command, control commands set in advance according to the patterns of the brain signals generated from visual stimuli for colors may be provided, and in the step 630 of executing a control command, the control command matching the selected reference information may be executed.

Figure 7:
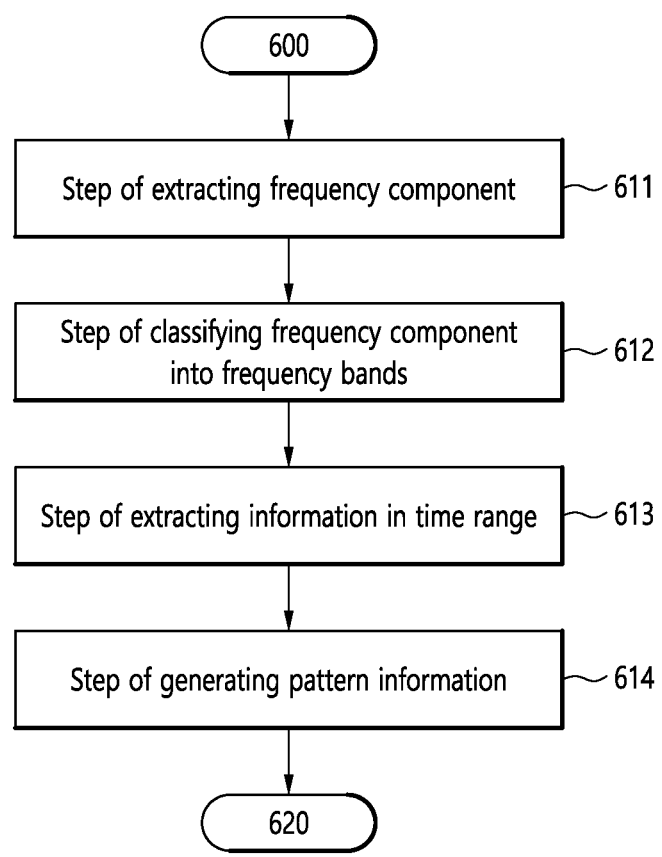
FIG. 7 is a detailed flowchart of a step of extracting pattern information of FIG. 6.

FIG. 7 is a detailed flowchart of the step of extracting pattern information of FIG. 6.

The step 610 of extracting pattern information may further include a step 611 of extracting a frequency component, a step 612 of classifying the frequency component into frequency bands, a step 613 of extracting information in a time range, and a step 614 of generating pattern information.

In the step 611 of extracting a frequency component, a frequency component may be extracted from the brain signal using a technique such as a fast Fourier transform (FFT).

In the step 612 of classifying the frequency component into frequency bands, information in at least one frequency band may be extracted from the frequency component extracted from the brain signal using a band pass filter provided at a preset frequency interval.

In the step 613 of extracting information in a time range, pattern information may be generated by extracting information in a preset time range from the brain signal classified into at least one frequency band.

Meanwhile, in the step 614 of generating the pattern information, pattern information may be generated by calculating a power spectrum density (PSD) calculated from the brain signal classified according to the frequency band and the time range.

While the present disclosure has been described with respect to the specific embodiments, it will be apparent to those skilled in the art that various changes and modifications may be made without departing from the spirit and scope of the disclosure as defined in the following claims.

DETAILED DESCRIPTION OF MAIN ELEMENTS

100: External device
200: Light-emitting body
300: Smart control device

What is claimed is:
1. A smart control device comprising:
a collection unit that collects a brain signal generated from a visual stimulus for a light-emitting body showing an arbitrary color;
a preprocessing unit that extracts pattern information according to a frequency band and a time range from the brain signal;
a selection unit that calculates correlations by comparing the pattern information to reference information provided in advance to represent patterns of brain signals generated from visual stimuli for colors, and selects the reference information having the highest correlation; and
a control unit that has control commands set in advance according to the patterns of the brain signals generated from visual stimulus for colors, and executes the control command matching the selected reference information,
wherein the arbitrary color comprises a plurality of colors and the control unit sets different control commands for each of the plurality of colors.
2. The smart control device according to claim 1, wherein the preprocessing unit generates the pattern information by extracting information in a time range of 3,000 ms from a brain signal classified into at least one frequency band.

3. The smart control device according to claim 1, wherein the pattern information is a result value of a power spectrum density calculated from the brain signal classified according to the frequency band and the time range.

4. The smart control device according to claim 1, wherein the selection unit calculates the correlations between the reference information and the pattern information according to a canonical correlation analysis, and selects the reference information having the highest correlation.

5. The smart control device according to claim 1, wherein the preprocessing unit generates at least one frequency band by dividing a frequency range of 0.1 Hz to 50 Hz by a preset frequency interval.

6. The smart control device according to claim 1, wherein the plurality of colors comprises at least two colors selected from the group consisting of red, green, blue, gray, and white.

7. A control method of a smart control device for determining a user's intention from a color stimulus based on a brain-computer interface, the control method comprising:
   a step of collecting a brain signal generated from a visual stimulus for a light-emitting body showing an arbitrary color;
   a step of extracting pattern information according to a frequency band and a time range from the brain signal;
   a step of calculating correlations by comparing the pattern information to reference information provided in advance to represent patterns of brain signals generated from visual stimuli for colors, and selecting the reference information having the highest correlation; and
   a step of providing control commands set in advance according to the patterns of the brain signals generated from visual stimulus for colors, and executing the control command matching the selected reference information,
   wherein the arbitrary color comprises a plurality of colors and the step of providing control commands sets different control commands for each of the plurality of colors.

8. The control method according to claim 7, wherein, in the step of extracting pattern information, the pattern information is generated by extracting information in a time range of 3,000 ms from a brain signal classified into at least one frequency band.

9. The control method according to claim 7, wherein the pattern information is a result value of a power spectrum density calculated from the brain signal classified according to the frequency band and the time range.

10. The control method according to claim 7, wherein, in the step of selecting the reference information having the highest correlation, the correlations between the reference information and the pattern information are calculated according to a canonical correlation analysis, and the reference information having the highest correlation is selected.

11. The control method according to claim 7, wherein, in the step of extracting pattern information, at least one frequency band is generated by dividing a frequency range of 0.1 Hz to 50 Hz by a preset frequency interval.

12. The control method according to claim 7, wherein the plurality of colors comprises at least two colors selected from the group consisting of red, green, blue, gray, and white.

13. A smart control device comprising:
   a collection unit that collects a brain signal generated from a visual stimulus for a light-emitting body showing an arbitrary color;
   a preprocessing unit that extracts pattern information according to a frequency band and a time range from the brain signal;
   a selection unit that calculates correlations by comparing the pattern information to reference information provided in advance to represent patterns of brain signals generated from visual stimuli for colors, and selects the reference information having the highest correlation; and
   a control unit that has control commands set in advance according to the patterns of the brain signals generated from visual stimulus for colors, and executes the control command matching the selected reference information,
   wherein the light-emitting body turns on and off at a plurality of frequencies and the control unit sets different control commands for each of the plurality of frequencies.

14. The smart control device according to claim 13, wherein the preprocessing unit generates the pattern information by extracting information in a time range of 3,000 ms from a brain signal classified into at least one frequency band.

15. The smart control device according to claim 13, wherein the pattern information is a result value of a power spectrum density calculated from the brain signal classified according to the frequency band and the time range.

16. The smart control device according to claim 13, wherein the selection unit calculates the correlations between the reference information and the pattern information according to a canonical correlation analysis, and selects the reference information having the highest correlation.

17. The smart control device according to claim 13, wherein the preprocessing unit generates at least one frequency band by dividing a frequency range of 0.1 Hz to 50 Hz by a preset frequency interval.

* * * * *